United States Patent [19]

Tateoka et al.

[11] Patent Number: 4,590,845
[45] Date of Patent: May 27, 1986

[54] PNEUMATIC SERVO BOOSTER

[75] Inventors: Kiyoshi Tateoka, Kanagawa; Hiromi Ando, Tokyo, both of Japan

[73] Assignee: Tokico Ltd., Kanagawa, Japan

[21] Appl. No.: 214,433

[22] Filed: Dec. 8, 1980

[30] Foreign Application Priority Data

Dec. 14, 1979 [JP] Japan .................... 54-173133[U]

[51] Int. Cl.[4] ............................................. F15B 9/10
[52] U.S. Cl. .................... 91/369 A; 91/376 R
[58] Field of Search ............ 91/369 A, 369 B, 369 R, 91/376 R

[56] References Cited

U.S. PATENT DOCUMENTS

| | | | |
|---|---|---|---|
| 3,688,647 | 9/1972 | Kytta | 91/369 A |
| 3,937,021 | 2/1976 | Sisco et al. | 91/369 A |
| 4,043,251 | 8/1977 | Ohmi | 91/369 B |
| 4,200,029 | 4/1980 | Ohmi | 91/369 A |
| 4,257,312 | 3/1981 | Ohmi et al. | 91/369 A |
| 4,287,811 | 9/1981 | Katagiri et al. | 91/369 A |

Primary Examiner—Robert E. Garrett
Assistant Examiner—Mark A. Williamson
Attorney, Agent, or Firm—Wenderoth, Lind & Ponack

[57] ABSTRACT

A pneumatic servo booster includes a housing, a flexible diaphragm partitioning the interior of the housing into front and rear chambers, a valve body slidably mounted in the housing and connected to the diaphragm, and a valve mechanism incorporated in the valve body and including a poppet valve cooperating with a valve seat formed on the valve body and with another valve seat formed on a plunger which is connected to an input rod and is slidably mounted in the valve body. A return movement restricting member restricts the return movement of the plunger with respect to the housing when the valve body returns to its return position.

1 Claim, 7 Drawing Figures

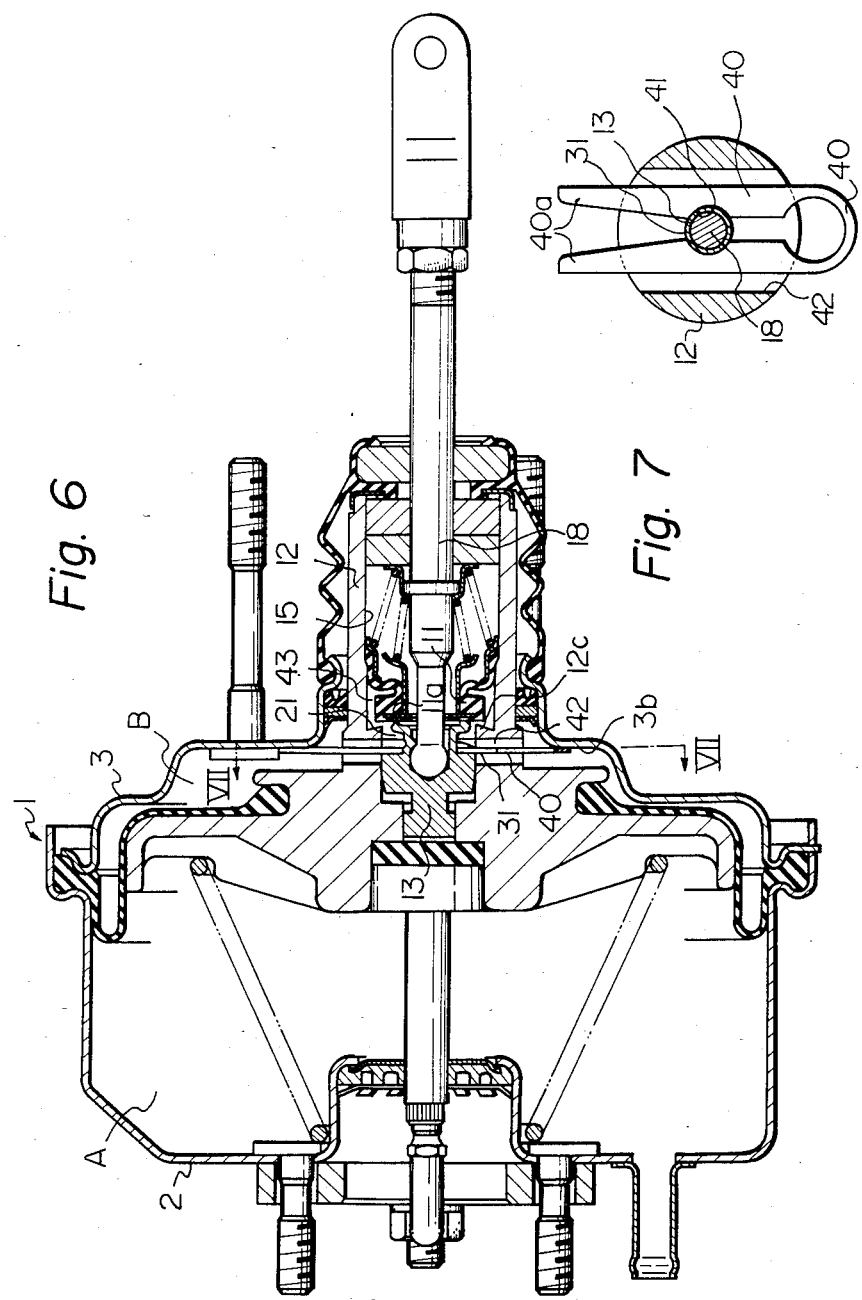

PNEUMATIC SERVO BOOSTER

BACKGROUND OF THE INVENTION

This invention relates to pneumatic servo boosters and, particularly to pneumatic servo boosters of the kind including a housing, a flexible diaphragm partitioning the interior of the housing into two chambers, a valve body connected to the diaphragm and slidably extending through the housing, and a valve mechanism incorporated in the valve body.

The valve mechanism conventionally comprises a poppet valve cooperating with a valve seat formed on the valve body and with another valve seat formed on a plunger which, in turn, is connected to an input rod and is slidably mounted in the valve body. When the poppet valve is spaced from the valve seat of the valve body and is seated on the valve seat of the plunger, the two chambers in the housing are communicated with each other and are maintained at a first referential pressure such as a vacuum pressure, and when the poppet valve engages with the valve seat of the valve body and separates from the valve seat of the plunger, the communication between the two chambers is intercepted and a second referential pressure such as an atmospheric pressure is introduced into one of the chambers while the other chamber is maintained at the first referential pressure.

In the non-actuated condition of the servo booster of the aforementioned kind, the poppet valve is spaced from the valve seat of the valve body by a predetermined small clearance, and the poppet valve seats on the valve seat of the plunger. The clearance is effective in increasing the space between the poppet valve and the valve seat of the valve body in the return stroke of the servo booster thereby improving the responsiveness of the servo booster in the return stroke. However, in actuating the servo booster it is necessary to firstly take up the clearance, i.e., the clearance constitutes an ineffective stroke in the actuating stroke of the servo booster, thereby deteriorating the responsiveness and the pedal feeling of the servo booster in the actuating stroke.

SUMMARY OF THE INVENTION

An object of the present invention is to provide a pneumatic servo booster having an improved responsiveness both in the actuating and return strokes.

The pneumatic servo booster according to the invention comprises a return movement restricting member for restricting the return movement of the plunger with respect to the housing when the valve body returns to its return position.

The foregoing and other objects and advantages of the invention will become apparent from the following description and the attached drawings.

BRIEF DESCRIPTION OF THE DRAWINGS

In the drawings:

FIG. 6 is a longitudinal sectional view of another embodiment of the invention; and FIG. 7 is a sectional view taken along line VII—VII in FIG. 6.

DETAILED DESCRIPTION OF THE PREFERRED EMBODIMENTS

Figure 1:
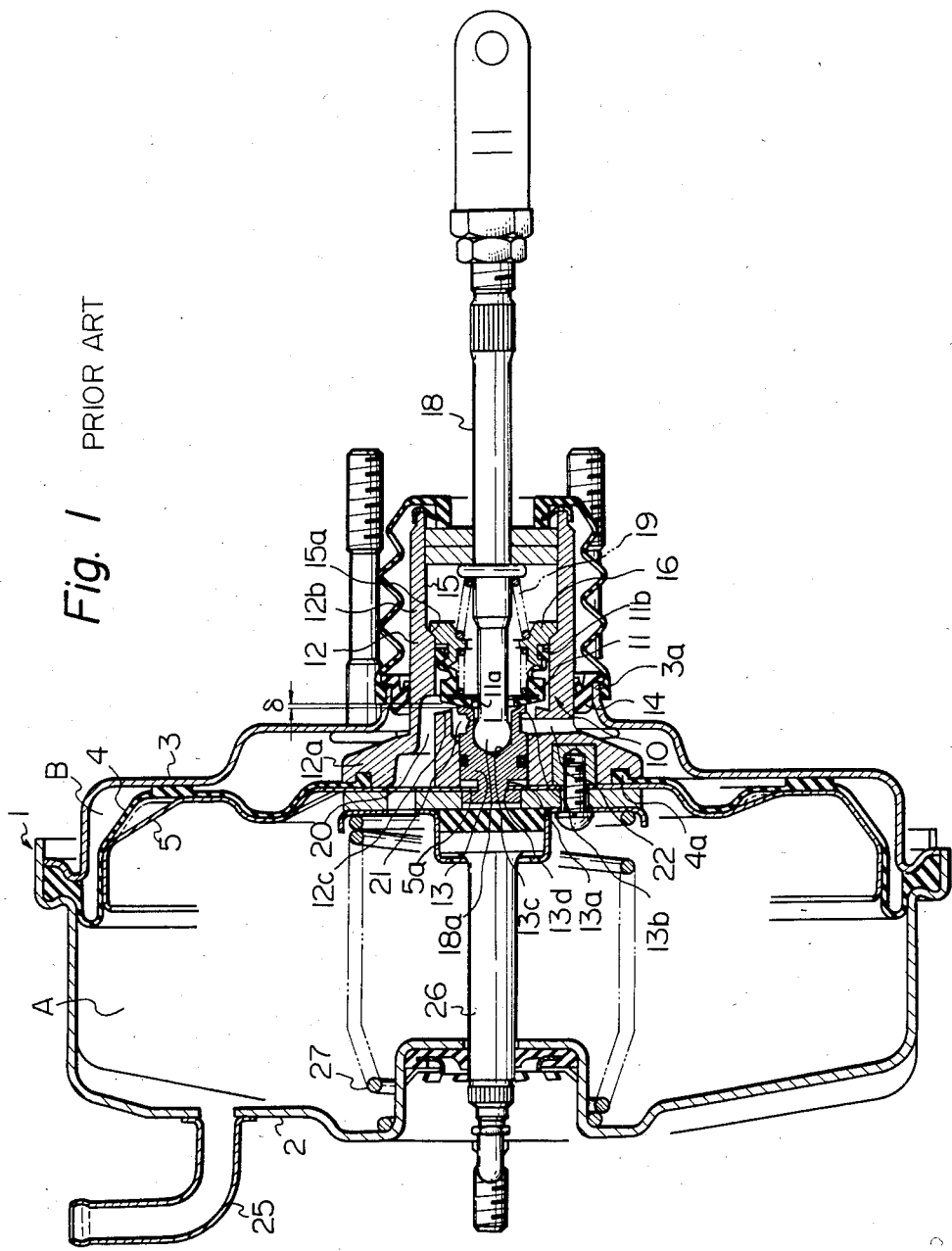
FIG. 1 is a longitudinal sectional view of a prior art servo booster.

FIG. 1 illustrates a typical prior art pneumatic servo booster which comprises a housing 1 consisting of front and rear shells 2 and 3, a flexible diaphragm 4 dividing the interior of the housing into two chambers A and B, a power piston 5 secured to the diaphragm. A poppet valve mechanism 10 connects or disconnects the communication between the two chambers A and B and the communication between the chamber B and the atmosphere. It will be noted that the chamber A is connected with a source of vacuum pressure such as an intake manifold of an engine of a vehicle. The poppet valve mechanism 10 comprises a poppet valve 11, an annular valve seat 12c formed on a valve body 12, and an annular valve seat 13b formed on a plunger 13. The valve body 12 slidably extends through the rear shell 3 and has a large diameter portion 12a on the inner end thereof, to which the inner end 4a of the diaphragm 4 is connected. The plunger 13 is slidably fitted in the valve body 12 and is secured to an input rod 18. The relative axial movement of the plunger 13 with respect to the valve body 12 is restricted by the radially inner end 5a of the power piston 5 which is loosely fitted in an annular groove 13a formed in the outer circumference of the plunger 13. It will be noted that the power piston 5 has a non-circular opening to define the inner end 5a. A seal 14 is interposed between the rear shell 3 and a small diameter portion 12b of the valve body 12 so as to sealingly and slidably support the valve body 12. The small diameter portion 12b of the valve body 12 has a bore 15 therein, and a spring retainer 16 is fitted in the bore 15 and is retained by a shoulder 15a formed in the bore 15. The spring retainer 16 supports one end 11b of the poppet valve 11 and sealingly urges the one end against the bore 15. The other end 11a of the poppet valve 11 cooperates with the valve seats 12c and 13b. The input rod 18 is rearwardly urged by a coil spring 19 which is supported on the spring retainer 16.

In the non-actuated condition of the servo booster shown in the drawing, the rearward movement of the plunger 13 is restricted by the inner end 5a of the power piston 5 and a clearance $\delta$ is formed between the poppet valve 11 and the valve seat 12c of the valve body 12, while, the poppet valve 11 engages with the valve seat 13b of the plunger 13. The chamber B is connected with the chamber A through an axial passage 20 formed in the large diameter portion 12a of the valve body 12, an annular space 21 formed in the valve body 12, and a radial passage 22 formed in the valve body 12.

In actuating the servo booster, the input rod 18 is displaced leftward as viewed in the drawing, the poppet valve 11 engages with the valve seat 12c after taking up the clearance $\delta$ thereby disconnecting the communication between the chambers A and B. Thereafter, the poppet valve 11 separates from the valve seat 13b of the plunger 13 so that the chamber B is connected with the atmosphere through the radial passage 22, the annular space 21, a space formed in the bore 15 of the valve body 12 and around the input rod 18, an air cleaner, and an opening formed in the rear end of the small diameter portion 12b of the valve body. A pressure difference generates between the chambers A and B, and the power piston 5 and the diaphragm 4 together with the valve body 12 displace leftward. An output force is transmitted through an output rod 26 to such as a piston of a master cylinder (not shown) of a hydraulic braking system of the vehicle. There is provided a reaction disc to transmit the output force from the power piston 5 to the output rod 26 and also to transmit a reaction force to the input rod 18 through the plunger 13.

It will be understood that the responsiveness of the servo booster in the actuating stroke is mainly determined by the maximum lift or the clearance between the valve seat 13b of the plunger 13 and the poppet valve 11 in the actuating stroke, and the responsiveness in the return stroke is mainly determined by the maximum lift or the clearance between the valve seat 12c of the valve body and the poppet valve 11 in the return stroke. In the prior art servo booster shown in the drawing, the maximum clearance between the valve seat 12c and the poppet valve 11 is equal to the clearance $\delta$ in the non-actuated condition. However, the clearance $\delta$ constitutes an ineffective stroke in the actuating stroke thereby deteriorating the pedal feeling.

Figure 2:
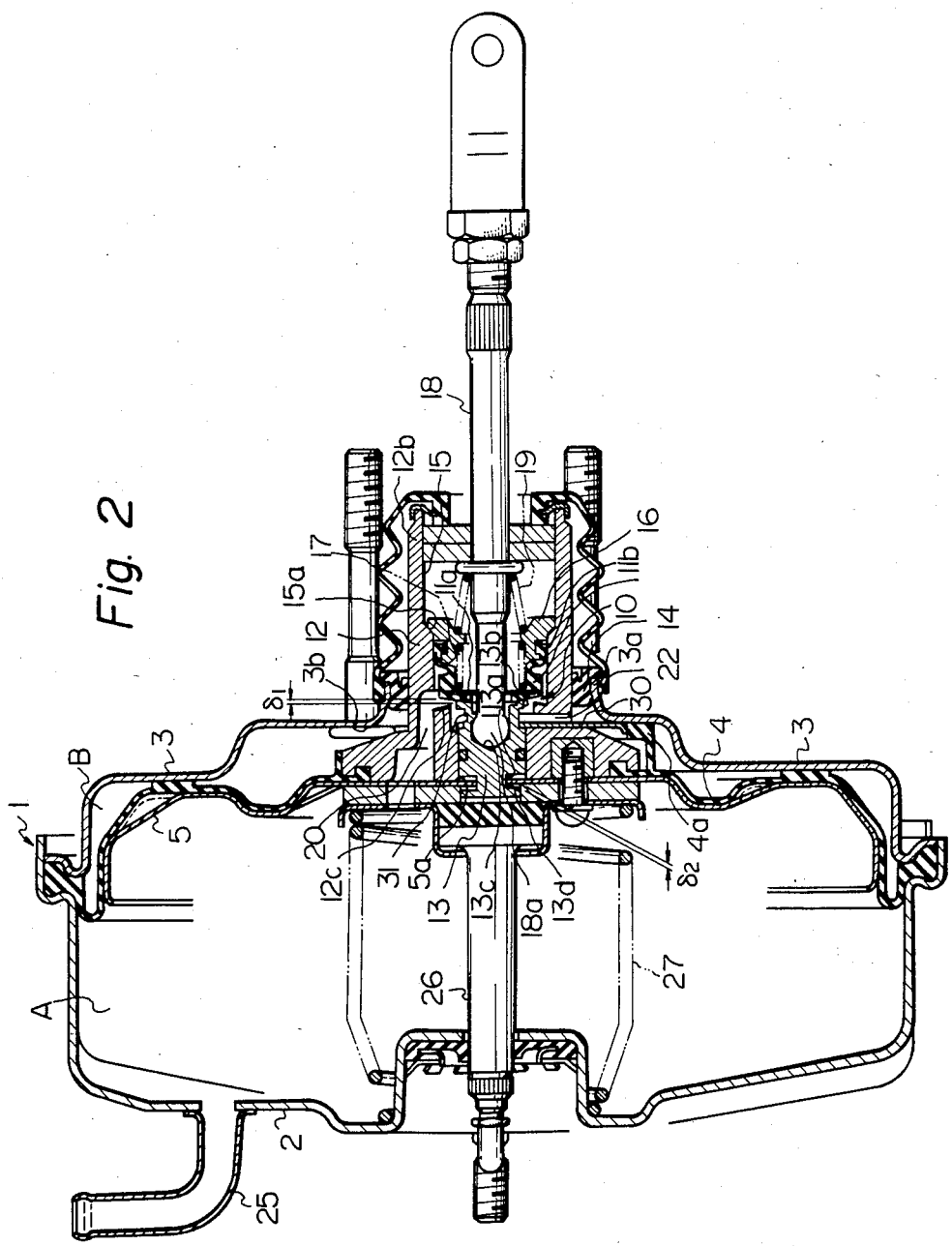
FIG. 2 is a longitudinal sectional view of a pneumatic servo booster according to the invention.
Figure 3:
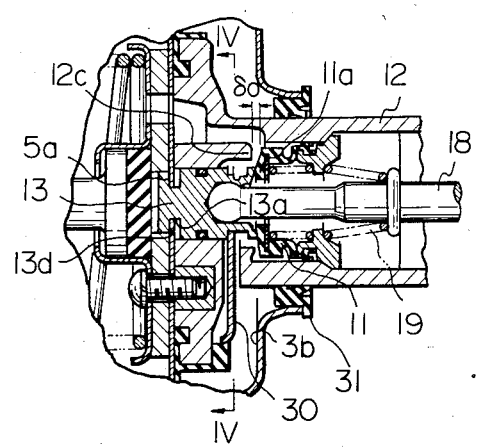
FIG. 3 is a partial sectional view showing the essential portion of FIG. 2 in the return stroke of the servo booster.
Figure 4:
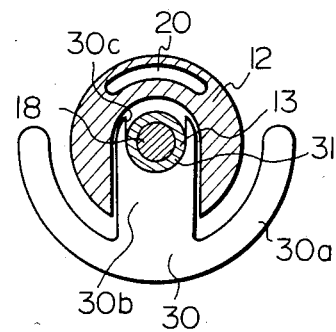
FIG. 4 is a sectional view taken along line IV—IV in FIG. 3.

FIGS. 2-4 illustrate a pneumatic servo booster according to the invention and, since the construction is generally similar to the servo booster of FIG. 1, the same numerals have been applied to corresponding parts and detailed descriptions therefor are omitted.

According to the invention, a return movement restricting member 30 restricts the return movement of the plunger 13 with respect to the housing 1. The return movement restricting member 30 comprises, as shown in FIG. 4, a circumferential portion 30a which extends circumferentially along nearly 180°, and a radial portion 30b which extends radially inwards from the central portion of the circumferential portion 30a. A U-shaped cut-out 30c is formed in the upper end of the radial portion 30b for engaging with a reduced diameter portion 31 of the plunger 13. The radial portion 30b loosely extends through the radial passage 22 of the valve body 12, and the circumferential portion 30a is adapted to engage with a vertical inner surface 3b of the rear shell 3. The circumferential portion 30a is retained by a resilient retaining portion 4a which is integrally projecting from the diaphragm 4. The retaining portion 4a supports the restricting member 30 with the cut-out portion 30c contacting with the reduced diameter portion 31. In the non-actuated condition of the servo booster shown in FIG. 2, the circumferential portion 30a of the restricting member 30 abuts with the inner surface 3b of the rear shell 3, the cut-out portion 30c of the restricting member 30 abuts with an annular shoulder formed on the inner end of the reduced diameter portion 31 of the plunger 13 thereby restricting the rearward or return movement of the plunger 13 and the input rod 18 with respect to the housing 1, and the radial portion 30b of the restricting member 30 abuts with the inner wall of the passage 22 of the valve body 12 thereby restricting the rearward or return movement of the valve body 12 with respect to the housing. In FIG. 2, a clearance $\delta_1$ is formed between the valve seat 12c of the valve body 12 and the poppet valve 11, and a clearance $\delta_2$ is formed between the inner end 5a of the power piston 5 and the inner end 13d of the annular groove 13a of the plunger 13. The maximum lift $\delta_0$ (FIG. 3) between the valve seat 12c and the poppet valve 11 in the return stroke of the servo booster is the sum of the clearances $\delta_1$ and $\delta_2$. The amount of $\delta_1$ can be decreased to the minimum as compared with $\delta$ in the prior art servo booster, with the amount of $\delta_0 = \delta_1 + \delta_2$ being maintained equal to or larger than that of $\delta$. Therefore it is possible to minimize the ineffective stroke of the servo booster and to improve the responsiveness in the return stroke.

Figure 5:
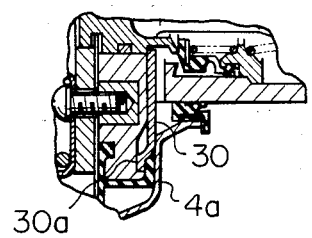
FIG. 5 is a partial sectional view showing a modified form.

FIG. 5 shows a modified form wherein the return movement restricting member 30 is generally similar to the embodiment of FIGS. 2-4, but the outer circumference of the circumferential portion 30a is bent and displaced in the foward direction as clearly shown in FIG. 5, and the retaining portion 4a has a correspondingly shaped tip end which may be resiliently clamped between the inner wall 3b of the rear shell 3 and the circumferential portion 30a of the restricting member 30 when the restricting member 30 abuts with the rear shell 3.

FIGS. 6 and 7 show another embodiment of the invention. As shown in FIG. 7, the return movement restricting member 40 has a generally U-shaped configuration and has a recess 41 adapted to fit with the reduced diameter portion 31 of the plunger 13 in the lengthwise central portion. A circular arc portion 40b and tip end portions 40a of the restricting member 40 are adapted to abut with the inner surface 3b of the rear shell 3 in the non-actuated condition of the servo booster illustrated in FIG. 6. The annular space 21 is connected to the chamber B through radial opening 42 formed in the valve body. It will be noted that axial passages 20' similar to the axial passage 20 in FIG. 1 is shown in FIG. 7 to permanently connect the chamber A with an annular space 43. The restricting member 40 loosely passes through the opening 42 so that the restricting member 40 does not act to restrict the return movement of the valve body 12. The restricting member 40 is formed of a rigid material, alternatively, the restricting member 40 may be formed of a resilient material.

As described heretofore, according to the invention, a return movement restricting member is axially movably mounted on the valve body and is adapted to restrict the return movement of the plunger with respect to the housing, thus, it it possible to minimize the clearance between the valve seat of the valve body and the poppet valve in the non-actuated condition of the servo booster thereby improving the pedal feeling.

What is claimed is:

1. In a pneumatic servo booster of the type including a housing, a movable wall partitioning the interior of said housing into two chambers, a valve body connected to said movable wall, and a valve mechanism including a poppet valve, a valve seat formed on said valve body and another valve seat formed on a plunger which is slidably fitted in said valve body, said valve mechanism communicating said two chambers when said poppet valve is spaced from said valve seat on said valve body and engages with said valve seat on said plunger, and said valve mechanism intercepting communication between said two chambers when said poppet valve engages with said valve seat on said valve body and is separated from said valve seat on said plunger, the improvement comprising:

return movement restricting means for restricting directly the extent of return movement of said plunger with respect to said housing when said valve body returns to its return position during return movement of said valve mechanism to said non-actuated position of the servo booster, said return movement restricting means comprises a member which, when said servo booster is in said non-actuated position, has a first surface axially abutting said plunger and a second surface axially abutting a surface of said housing, thereby axially positioning said plunger with respect to said housing, said member comprising a portion extending through a radial passage in said valve body, and said passage partially providing communication between said two chambers when the servo booster is in said non-actuated position.

* * * * *